United States Patent [19]

Honig

[11] Patent Number: 4,642,206
[45] Date of Patent: Feb. 10, 1987

[54] PRODUCTION OF SPIN POLARIZED FUSION FUELS

[75] Inventor: Arnold Honig, Manlius, N.Y.

[73] Assignee: Syracuse University, Syracuse, N.Y.

[21] Appl. No.: 508,087

[22] Filed: Jun. 27, 1983

[51] Int. Cl.$^4$ .......................... G21C 3/04; G21C 21/00
[52] U.S. Cl. ..................................... 264/0.5; 376/127; 376/915; 376/916
[58] Field of Search .............. 376/106, 127, 915, 916; 264/0.5; 252/625; 324/308, 309

[56] References Cited

U.S. PATENT DOCUMENTS 3,953,789  4/1976  Veeman et al. ..................... 324/310

OTHER PUBLICATIONS

A. Honig, "Highly Spin-Polarized Proton Samples-Large, Accessible, and Simply produced", Phys. Rev. Lett., 19 (#18), 1009, (1967).
A. Honig and H. Mano, "Enhanced Nuclear Polarization of D in Solid HD", Phys. Rev. B, 14 (#5), 1858, (1976).
Polarized Proton and Deuteron Solid HD Targets Jun. 10, (1977) A. Honig Proceedings of the Symposium—at Fermilas Energies, ANL-HEP-CP-77-45.
"Resistance of Solid HD Polarized-Proton Targets to Damage From High-Energy Proton and Electron Beams" (1975) H. Mano & A. Honig, Nucl. Inst. & Methods, 124 (1975), pp. 1–10.
Toward Polarized Solid HD, A. Honig, From II International Conf. on Polarized Targets, Univ. of Cal, Berkeley (1971), pp. 99–102.

Primary Examiner—John F. Terapane
Assistant Examiner—Virginia Caress
Attorney, Agent, or Firm—Bruns and Wall

[57] ABSTRACT

Methods for producing large, highly nuclear spin-polarized thermonuclear fuels HD, $D_2$, HT and DT in a state where they can be stored and manipulated for appreciable times at ordinary liquid helium temperatures, are disclosed. Molecular mixtures, radiation treatments, symmetry species conversion catalysts, molecular species spatial arrangements, radio frequency irradiations and anneal programs are given to provide polarized ↑D and polarized ↑T in usable forms in the solid, liquid and high density gaseous phases.

13 Claims, 6 Drawing Figures

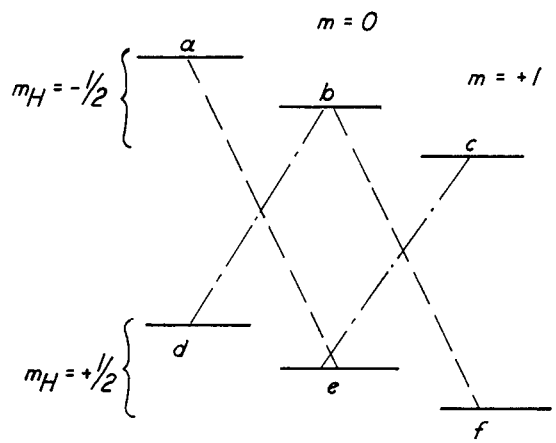
FIG. 2
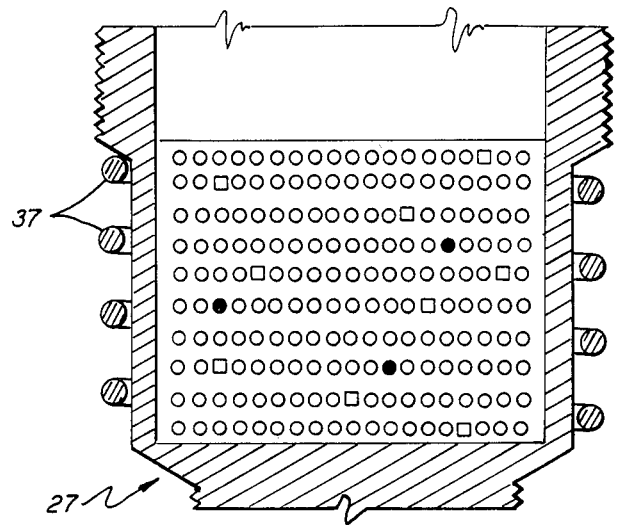
FIG. 3
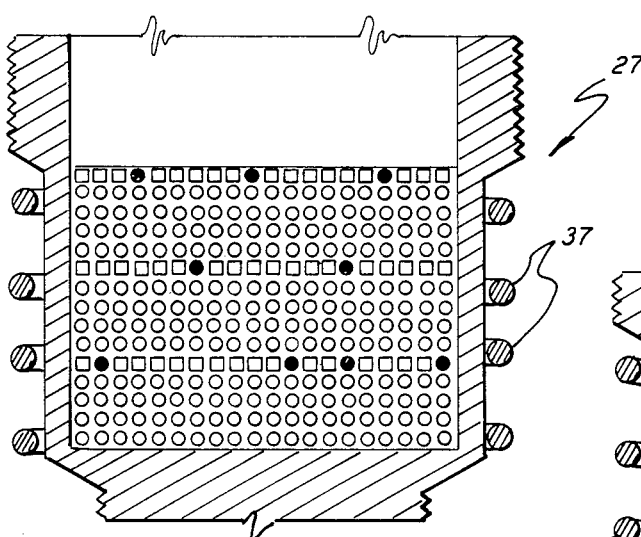
FIG. 4
○ — $O-D_2$
□ — $HD$
● — $O-H_2$
◇ — $HT$
FIG. 6
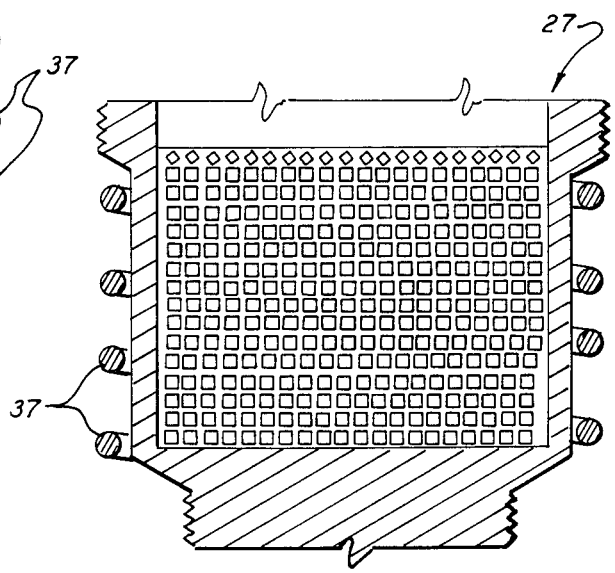
FIG. 5

PRODUCTION OF SPIN POLARIZED FUSION FUELS

BACKGROUND OF THE INVENTION

This invention relates to a method and apparatus for producing spin polarized thermonuclear fuels and, in particular, to spin polarized hydrogen isotopes.

Recent theoretical work published by R. M. Kulsrud et al, Phys. Rev. Lett 49 1248 (1982), indicates that highly spin polarized deuterons and tritons, which are mass 2 and mass 3 isotopes, respectively, of hydrogen, have highly advantageous properties as fuels for use in thermonuclear reactions when compared to more conventional non-polarized fuels. The advantages associated with these spin polarized fuels include increased reaction cross sections which lead to higher energy yields. Furthermore, the angular distribution of the emitted energetic neutrons are restricted thereby removing or greatly simplifying many of the problems ordinarily associated with magnetic and inertial confinement reactors. Some of the concepts that contribute to the present method of producing these spin polarized fuels in a form whereby they can be used practically as a reactor fuel and/or highly polarized beams have been developed over a period of years as a result of a good deal of work mostly carried out at Syracuse University located at Syracuse, New York. Representative publications describing this previous work are: A. Honig, Phys. Rev. Lett 19 1009 (1967); R. S. Rubins et al, Phys Rev. 169, 299 (1968); A. Honig, Proc II Internat. Conf. on Polarized Targets, Berkley (1971) p. 99; H. Mano et al, Nuc Instrum and Methods 124, 1 (1975); A. Honig and H. Mano, Phys. Rev. 14 1858 (1976); A. Honig, Proc of Symposium on Experiments Using Enriched Antiprotons, Polarized Proton and Polarized Antiproton Beams at Fermilab Energies, Argonne Nat. Lab. (1977) p. 186 (ANL-HEC-CP-77-45). The prior art is principally concerned with producing polarized H, for high energy targets.

The principal thrust of these current disclosures is for producing polarized D and T, the main thermonuclear fuels, with polarized H essentially incidental. It is of primary importance not only for the nuclei to be produced in the polarized state but for them to remain polarized at temperatures above about 1° K. and in moderate magnetic fields, where they can be easily manipulated and used in modes and configurations that have already been described for non-polarized hydrogen isotope fuels. In this regard some configurations and modes in which the present invention is usable are described in the following U.S. Pat. Nos. 3,624,239 to Frass; 3,953,617 to Smith et al; 4,017,578 to Jarboe et al; and 4,154,868 to Woerner. These patents primarily deal with singly injected frozen fuel pellets, encapsulated thermonuclear fuel particles, continually spun solid deuterium ($D_2$) pellets and the deposition of frozen deuterium-tritium (D-T) mixtures in microballoons or spheres. As should become evident from the present disclosure, the polarized fuels herein described may be employed in almost any fuel injection technique found in tokamak, tandem mirror, inertial confinement or other known reactor designs.

SUMMARY OF THE INVENTION

It is a primary object of the present invention to improve thermonuclear fuels.

It is a further object of the present invention to produce nuclear spin polarized fuel in solids that include the polarized hydrogen isotopes, deuterons and/or tritons.

Another object of the present invention is to provide spin polarized fuels wherein hydrogen isotopes remain metastably spin polarized for long periods of time at temperatures in the 1°–10° K. range and magnetic fields as low as about 0.1 Tesla.

Still another object of the present invention is to provide a thermonuclear fuel containing spin polarized hydrogen isotopes that are suitable for use in most presently known fuel injection techniques used in a temperature range greater than 1° K.

While a still further object of the present invention is to achieve high spin polarization of mixed molecular fuels in a temperature range of 2–20 mK region and to retain the polarization when the fuels are heated to temperatures above 1° K.

A still further object of the present invention is to provide a nuclear spin-polarization relaxation switch which allows polarization at temperatures and magnetic field values corresponding to high equilibrium polarization and then cuts off preventing depolarization when the material is exposed to temperatures and magnetic fields corresponding to low equilibrium polarization.

These and other objects of the present invention relate to solid nuclear spin-polarized fuels containing deuterons and/or tritons for enhancing reaction cross sections and other effects for facilitating controlled fusion wherein the fuels are polarized at high equilibrium values and then exposed to a spin-relaxation switch which permits the fuel to retain for long times its polarization at liquid helium temperatures and low strength magnetic fields. Suitable radio frequency (RF) induced transitions are used in conjunction with spin diffusion to transfer polarization from one hydrogen isotope to another at the high equilibrium polarization conditions or at the liquid helium temperature where spin polarization is metastably frozen.

BREIF DESCRIPTION OF THE DRAWINGS

For a better understanding of these and other objects of the present invention reference is had to the following detailed description of the invention that is to be read in conjunction with the accompanying drawings, wherein:

FIG. 2 illustrates magnetic dipolar coupled energy levels of a proton and deuteron in two molecules of HD crystal;

FIG. 3 shows an ortho-deuterium sample containing randomly introduced HD impurities and a small concentration of ortho-hydrogen impurities for producing polarized $D_2$;

FIG. 4 illustrates an epitaxially grown layered structure containing thick layers of $D_2$ and alternate thinner layers of HD and ortho-hydrogen (o-$H_2$) that is used to produce polarized $D_2$;

FIG. 5 illustrates the polarization of a thin layer of HT by growing it epitaxially on a larger polarized crystal of HD, and FIG. 6 is a legend showing the symbols used in conjunction with FIGS. 3–5.

DESCRIPTION OF THE INVENTION

Figure 1:
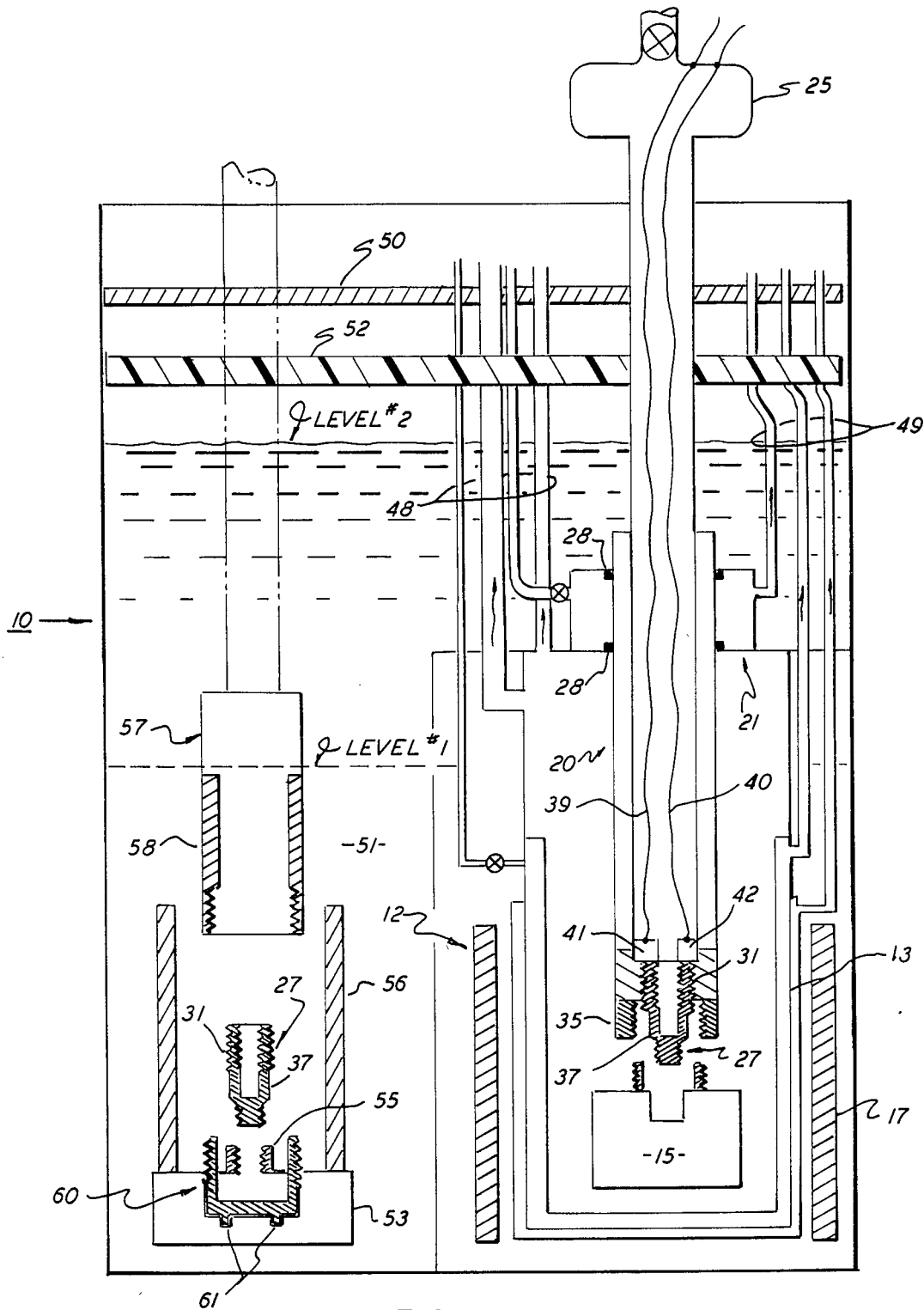
FIG. 1 is a schematic representation of apparatus for producing polarized solid fuels containing deuterors and/or tritons.

The production of solid ↑H↑D, where the left superscript arrow indicates a polarized nucleus will be initially described. This description introduces some of the principles of the prior art which are utilized herein in original and unobvious ways for polarizing other hydrogen isotope molecular solids. Scientific notations shall be used throughout this disclosure to define various parameters and relationships. It is also shown how to produce ↑H↑D as an important end material from which H↑T and ↑D↑T are produced. We begin with a sample of gaseous HD containing approximately $10^{-4}$ to $10^{-3}$ o-$H_2$ (ortho-hydrogen) concentration and generally, but not necessarily, a comparable amount of p-$H_2$ concentration (parahydrogen) wherein concentrations are given in mole fractions (moles/mole) and are thus unitless. All concentrations used herein shall be similarly noted in terms of mole fractions. Ortho and para- connote molecular symmetry species having respectively symmetric and anti-symmetric nuclear spin wave functions. It is assumed for purposes of this disclosure that the p-$D_2$ and o-$D_2$ concentrations, where para and ortho conform to the definition just given, are negligible, although that is not entirely necessary. In fact, for later applications, they may be intentionally introduced. The gas mixture is solidified and the resultant solid placed in a high magnetic field ($H_o$) and at a low temperature (T) so that the nuclear spins will become polarized. The degree of polarization of nuclei depends on the ratio $H_o/T$, measured in units Tesla/deg. K. These units for $H_o/T$ shall be used throughout this disclosure in relation to the degree of polarizatin of specified nuclei. Useful polarization is considered to be in the range from 20% to 90% whereby the $H_o/T$ ratios for proton would correspond to the range of 200 to 1450 Tesla/deg K. All temperatures are herein given as absolute temperatures on the Kelvin scale and will be noted as °K. or simply scientifically as K. For 90% polarization, a typical pair of temperature-magnetic field values are T=10 mK and $H_o$=14 Tesla. The achievement of equilibrium polarization takes place in a time of the order of the proton spin-lattice relaxation time, ($T_1^H$), which in the above specified sample is not excessively long (less than 1 day) at 10 mK and 14 Tesla. At T=4 K., the time is much shorter.

The efficient proton relaxation in the HD results from the o-$H_2$ impurity concentration, which itself relaxes rapidly and allows the neighboring and distant protons in HD to relax through spin-diffusion. The o-$H_2$ proton relaxation time, ($T_1^{o-H2}$), is very sensitive to o-$H_2$ concentration. By remaining at the high equilibrium polarization temperature-magnetic field conditions for a time long enough for appreciable o-$H_2 \rightarrow$p-$H_2$ conversion reactions to occur, usually a few days to a few weeks, reduction of the o-$H_2$ concentration, and hence a lengthening of the $T_1^{o-H2}$ and the $T_1^H$, takes place. This relaxation time lengthening can be great, leading to a $T_1^H$ of the order of days at a temperature of 4K. As a result of this, the polarized HD sample can be warmed up to 4 K. and retain its high polarization there metastably, allowing it to be used directly or to polarize other samples placed in contact with it by methods to be described later.

Turning now to FIG. 1, there is shown apparatus for carrying out the present invention that is generally referenced 10. The apparatus 10 serves as a dewar in which is located a dilution refrigeration assembly 12 containing a conventional 1° K. isolation pot referenced 13. A mixing chamber 15 is contained within the interior that is capable of providing temperatures down to 2–10 m°K. A super-conducting magnet 17 encloses the entire refrigerator and generates a 10–20 Tesla magnetic field in and about the sample. Tube assembly 20 is adapted to pass into the cryostat through a penetratable vacuum lock 21. Although not shown, the lock contains gate means that can open and close to permit entry and removal of the tube assembly into the interior of the cryostat. A gas reservoir 25 is mounted in the top of the tube and a sample holder 27 is threaded into the bottom of the tube which accepts a gas sample from the reservoir. The tube enters the cold region through the vacuum lock as illustrated and a pair of teflon O-rings 28—28 prevents leakage from the region.

Contact between the sample container and the mixing chamber is made through means of a threaded joint mating with the mixing chamber. As will be explained below, the removable connection is needed in order to place the sample in a second higher temperature environment after the nuclei are polarized. A permanent magnet 35 is secured to the sample tube and provides about a 0.1 Tesla field about the sample container. This relatively modest field maintains the long proton relaxation time $T_1^H$ during subsequent removal of the sample from the cryostat.

A RF coil 37 surrounds the sample container. The leads 39 and 40 to the coil 37 make contact with the electrical terminals 41 and 42 in the tube. Although not shown, the leads are brought out of the gas reservoir and operatively attached to a suitable R.F. source of any suitable construction.

Initially the main dewar region is filled with liquid helium to level 1 illustrated in dotted outline in FIG. 1. Upon the production of a polarized solid sample in the dilution refrigerator, the helium level is raised to a second level 2 and the sample is withdrawn from the dilution refrigerator assembly through the vacuum lock, which also serves as a liquid helium lock. The sample container, however, is not withdrawn from the helium bath. When the sample container is clear of the lock, rotatable dewar plate 50 and liquid nitrogen cooled baffle 52 is rotated to place the container over a second temperature holding region 51 that is at about 4° K. Flexible service lines 48 and 49 pass between the refrigerator assembly and the plate to permit the plate to be rotated.

The repositioned sample container is then lowered via the sample tube into a holding unit 53 seen on the left hand side of FIG. 1. Through use of the right hand - left hand thread, the sample container is permitted to be first attached to a threaded coupling 55 in the base and then disconnected from the tube.

The holding unit includes its own holding magnet 56 that insures that the sample remains in a suitable weak holding magnetic field to prevent rapid depolarization of the sample. The sample is retrieved by means of an external liquid helium shrouded retrieving mechanism 57 which also has its own holding magnet 58. The retrieval mechanism is threaded into a lifting assembly 60 slidably contained in the holding unit. Pins 61—61 prevent the assembly from turning in the unit while at the same time allowing the assembly to be raised vertically by the retrieval mechanism.

After removal from the dewar, the sample can be used directly or stored in a second dewar where a number of polarized samples may be brought together to form a larger sample. As can be seen in this unit, the sample is never above the temperature of liquid helium temperatures and hence retains its metastably frozen-in nuclear spin polarization. Other variations of this apparatus may be used in the practice of the present invention.

For the D in HD to be polarized from 20%–90% range, an $H_o/T$ ratio span of 1000 to 7500 Tesla/°K. is required. A typical temperature-magnetic field combination for 90% polarization is 2 mK and 15 Tesla. An indirect way of polarizing ↑D in ↑HD at lower $H_o/T$ ratios than 1000 to 7500 has previously been devised and, in fact, at ratios corresponding to the lower ones given previously for protons, by using interaction with the polarized $^{52}$H in ↑HD. The radio-frequency coil wrapped around the sample tube in FIG. 1 is essential for this purpose, as well as for monitoring the degree of polarization of the samples. The theory of D polarization is illustrated in FIG. 2. The diagram shows the magnetic energy levels of a dipolar-interaction coupled deuteron on an HD molecule with the proton on another HD molecule in HD solid wherein $m_H$ and $m_D$ are respectively the proton and deuteron magnetic projection quantum numbers. The six levels shown correspond to the six possible ($m_H$, $m_D$) combinations. The dashed lines indicate partially forbidden radio-frequency transitions, ($\Delta m_H = \pm 1$, $\Delta m_D = \pm 1$), between the levels, the probability of which increase approximately quadratically with decreasing magnetic field. When the protons in HD are polarized, and the deuterons are not, such as in the first stage of the method for HD, the lower 3 levels are equally populated and the upper 3 are almost empty. It is easy to see how transitions along the dotted lines can produce inequality among the $m_D$ levels, and hence nuclear polarization. Some of the techniques for achieving most effective polarization are steady state induced forbidden transitions, successive saturation of forbidden transitions at relatively low magnetic fields, and adiabatic rapid passage through the forbidden transitions. In addition, mixing of levels for very short times at very low magnetic fields also produces deureron polarization from a starting sample of HD in which only the protons are polarized. These methods are described in the reference by A. Honig and H. Mano, Phys. Rev.B14, 1858 (1976). The radio-frequency irradiation procedure is preferably carried out using magnetic field cycling techniques in which the magnetic field is temporarily lowered from its high field value for a duration much less than the proton spin-lattice relaxation time, $T_1^H$. Accordingly, the transition probability is high and less radio-frequency power dissipation occurs during irradiation. Radio-frequency irradiation can be achieved either in the dilution refrigerator (at about 10 mK) or after the sample is warmed to the 1–4K. ordinary liquid helium 4 temperature region. In the former case, higher ultimate deuteron polarization is generally obtainable since the protons can have their equilibrium polarization re-established after sharing polarization with the deuterons. Appreciable deuteron polarization can also be obtained after a one-shot proton polarization.

The following examples are methods for polarizing thermonuclear fuels including HD, $D_2$, HT and DT which are novel applications of the principles of the preceding ↑H↑D polarization method, or in which the ↑H↑D is produced in order to effect polarization by new techniques herein disclosed.

EXAMPLE 1.

The apparatus is used to polarize D in HD by a direct p-$D_2$ relaxation switch method analogous to the o-$H_2$ relaxation switch method used to polarize H in HD. A greater $H_o/T$ ratio is required than for polarized H which is in the range of 1000–7500 Tesla /°K. for 20%–90% polarization. In addition, a more rapid p-$D_2 \rightarrow$ o-$D_2$ conversion than the natural rate is required. By a piston bar above the solid sample, uniaxial compression can be applied or similarly, liquid helium over the sample can be pressurized to apply a hydrostatic pressure to the solid sample. Either method increases the conversion rate through modifications of the phonon spectra. Alternatively, crystal defects can be introduced by ultraviolet, X'ray, $\gamma$-ray or high energy particle beam radiation, which speeds up the conversion rate, as disclosed indirectly in the work of Gaines, Tsugawa and Souers, Phys. Rev. Lett 42, 1717 (1979). This can be done in the apparatus of FIG. 1, where the sequence of the sample positions in the two assemblies is in the reverse of that used in the polarizing process. After polarization and warm-up, the defects are annealed out at a suitable temperature in the solid phase in a time short compared to the nuclear depolarization rate, or by warming rapidly to the liquid state and refreezing, thereby permitting retention of the polarized D in the HD for long times in the 4 K. temperature region. The poor crystal structure generally resulting from rapid refreezing is not of great consequence. Good crystal structure, mostly for thermal conductivity purposes, is important only in the initial high polarization production process.

EXAMPLE 2

Polarized D in ortho-$D_2$ is produced using the apparatus and a method similar to that described in regard to HD. This material is important because it provides more concentrated thermonuclear polarized fuel, since there is no dilution with hydrogen. It is also important because liquid o-$D_2$ has a very long spin-lattice relaxation time. The method discussed in Example 1 above is used to polarize D in $D_2$. The important new feature for this case is that the $D_2$ consists of almost pure o-$D_2$, which unlike its counterpart p-$H_2$, has a net nuclear magnetic moment in the ground rotational J=0 state and hence is polarizable. Only about 90% of the maximum polarization achievable in Example 1 is possible in this case because of the small fraction of non-polarizable total spin I=0 state of o-$D_2$. A small p-$D_2$ concentration ($\sim 10^{-3}$ mole fraction) is added to the sample to facilitate the spin-lattice relaxation in the polarizing phase of the method. The same limitations apply here with respect to the need for a speed-up in the p-$D_2$ to o-$D_2$ conversion of the small p-$D_2$ concentration which is introduced.

EXAMPLE 3

Polarized T in either a DT or HT sample is herein produced. Polarized T is a particularly important fuel, since it has the lowest nuclear ignition temperature of the hydrogen isotopes. The methods analogous to polarization of H in HD are used herein, but important variations in the usage are taken into account. First, T has a nuclear magnetic moment of magnitude comparable to that of H and a spin of $\frac{1}{2}$, as does H. The $H_o/T$ ratios are thus close to those of protons, ranging from 190–1350 for 20%–90% polarization. In addition, o-$T_2$ and p-$T_2$ play the same roles as o-$H_2$ and p-$H_2$ in the HD. The principal new characteristic considered herein is the beta radioactivity of tritons. Samples of ~1 cm$^3$ volume, easily polarizable for solid HD, are too large when they consist of solid HT or DT. The heat load from absorbed tritons beta rays amounts to about 0.1 watt/cm$^3$. Thus, with a refrigerator whose cooling power at 10 mK is 10 $\mu$w, one is essentially limited to an HT or DT volume of 10$^{-4}$ cm$^3$ by this method. Furthermore, since the method requires fairly long times for producing the polarization (the o-$T_2 \rightarrow$ p-$T_2$ conversion time, if metastability at the higher temperatures is sought), the triton containing crystals accumulate relatively large amounts of radiation damage centers which make the spin-lattice relaxation times extremely short at temperatures near 4K. By use of a thin crystal of thickness less than 1 $\mu$m, for example epitaxially grown on HD or on p-$H_2$, radiation damage which affects the HT sample is limited since most of the beta particles are not absorbed in the HT sample. In this method, the polarized tritons are easily separated from the HD or p-$H_2$ substrate by surface boil-off, or fractional distillation. The substrate is used over and over again for processing thin layers of polarized T, by epitaxially depositing the thin layers of HT (or DT) on the substrate, polarizing the T (and D, if DT is used) with a combination of the previous methods and radio frequency irradiation, and distilling off the H↑T or ↑D↑T. This cycle can be repeated.

Random dilution of tritons in an HD solid is a usable alternative when small quantities of polarized tritons suffice and the presence of large quantities of H isn't deleterious, since it is hard to separate the T from the H in this usage. An additional feature of this method is that the radiation damage centers catalyze the o-$T_2 \rightarrow$ p-$T_2$ conversion, as in the reference made to Gaines et al in Example 1 above. Finally, radiation damage centers alone provide the spin-lattice relaxation without the presence of o-$T_2$ for achieving the high equilibrium polarization, obviating the need for a long conversion waiting time, with its attendant accumulation of radiation damage. After polarization, quick warming anneals, effected with a laser or conducting heat source, are utilized to maintain a long spin-lattice relaxation time at 4 K. With concentrated HT samples, a periodic annealing program every few minutes is used to keep radiation damage from lowering the relaxation time and producing depolarization in the 1-4 K. temperature region. Experiments lead one to expect a depolarization of about 50% every 1000 seconds at a temperature of 1 K. for concentrated HT or DT due to internally generated radiation damage, and every 100 seconds at 4 K. By diluting the HT or DT in HD or p-$H_2$, the required anneal regime is much less severe, as is especially the case in crystals of about 1 $\mu$m thickness grown between alternare 3 to 10 $\mu$m HD or p-$H_2$ layers. In the latter case, the radiation damage is concentrated in the HD or p-$H_2$ portion of the crystal and does not strongly affect the triton relaxation time. Even though only small amounts of polarized T are produced at a given time due to heat load, the total time required to produce the small polarized T sample is quite short since no conversion waiting time is necessary. Thus, large samples accumulated from successive small sample polarizations are possible in a reasonable time.

EXAMPLE 4

↑D is polarized in H↑D using radio-frequency irradiation to induce transitions as in FIG. 2, in which conversion time is eliminated because H is not required to be polarized metastably at the 1-4 K. temperatures. From the fusion point of view, unpolarized H is of little consequence. The sample is prepared with a substantial concentration of o-$H_2$ (~$10^{-3}$-$10^{-2}$) to give a proton relaxation rate close to the maximum possible. Since the polarization of H is not to be preserved at 4 K., this is not of consequence but the added heat load of o-$H_2$ conversion is taken into account when large samples (>10 cm$^3$) are polarized. The p-$D_2$ concentration is extremely small (<$10^{-6}$) and is brought about either by purification or prior conversion, so that in the absence of appreciable p-$D_2 \rightarrow$ o-$D_2$ conversion during the polarization process, which is inevitable since the aim is a short duration polarization process, the D relaxation time at 4 K. will still be very long. The method is thus derivative of the radio-frequency assisted D polarization process for HD discussed earlier, but in which a long waiting time for o-$H_2$-p-$H_2$ conversion is not required.

EXAMPLE 5

Sample of $D_2$ is prepared so that $T_1^D$ is initially very long by keeping the concentration of p-$D_2$ very small (<$10^{-6}$). HD+o-$H_2$ is added in small concentrations, thereby enabling D to be highly polarized at the $H_o$/T ratios corresponding to protons rather than to those corresponding to deuterons. Two spatial arrangements are given. The first is illustrated in FIG. 3. Approximately 1-10% HD and about $10^{-3}$ to $10^{-2}$ o-$H_2$ are mixed randomly in the gaseous phase with the pure o-$D_2$, after which one proceeds as in Example 4 above. The ↑D in the random ↑H↑D molecules pass their polarization to neighboring D in o-$D_2$ molecules, after which spin diffusion accounts for spreading the polarization among all the D nuclei. Since the o-$D_2$ concentration exceeds that of HD, repeated polarization of the H and D in HD must be carried out, but this is not difficult, since the proton relaxation time is kept short. The total polarization process for a large sample should not require more than a day.

An alternative geometry is shown in FIG. 4. Here, alternate layers of pure o-$D_2$ and (HD+o-$H_2$) are grown by simple vapor phase or liquid phase epitaxy. The $D_2$ layers are typically between about 1 $\mu$m and 10 $\mu$m thick, while the (HD+o-$H_2$) layers, where the o-$H_2$ concentration is about $10^{-3}$- $10^{-2}$, should be a few percent (<10%) of the thickness of the $D_2$ layers, so as not to over-dilute the polarized D with protons. Again, as in Example 4, repeated repolarizations of the HD are necessary. The advantage of this spatial configuration is that the o-$H_2$ and the HD are well coupled in their layer, and the spin-diffusion from a source plane is relatively more efficient than from point sources. As before, the ↑H need not retain their polarization in the 4 K. temperature region, and the polarization method can be carried out in relatively short times which are generally less than a day.

EXAMPLE 6

HT is epitaxially deposited on ↑H↑D or ↑HD at liquid helium temperatures, avoiding dilution refrigerator heat loading problems due to the radioactivity of the tritons. The polarization process is started with solid HT initially having no radiation damage. The o-$T_2$ concentration is very low ($10^{-4}$ or less, according to how long one wishes to store the polarized H↑T). By depositing epitaxially approximately 1 μm thick HT layers on ↑H↑D or ↑HD as shown in FIG. 5, the proton polarization diffuses to the H on the HT molecules, and the radio-frequency transitions cause the transfer of polarization from ↑H to T very rapidly, without requiring spin diffusion for the T polarization. The pertinent energy level diagram is similar in physical content to that of FIG. 2, but since the spin of T is ½, only 4 levels, two upper corresponding to $m_H=\frac{1}{2}$, $m_T=\pm\frac{1}{2}$, and two lower corresponding to $m_H=-\frac{1}{2}$, $m_T=\pm\frac{1}{2}$, are present. The use of thin HT depositions of ~1 μm make the HT less prone to radiation damage from the beta particles than is the case for thicker HT layers or bulk HT. Even in the worst case of thick HT layers, the 1000 second effective $T_1^H$ at 1 K., which is close to the value of the triton spin-lattice relaxation time, is still feasible, leading to useful polarized ↑T with or without anneal cycles. Liquid helium temperature regions are construed to include liquid helium 3 temperatures down to 0.3 K., for longer $T_1^H$ and $T_1^T$.

EXAMPLE 7

DT is epitaxially deposited on ↑H↑D, resulting in polarized ↑D↑T. This method is similar in most respects to that in Example 6 above, except that the D in the DT is polarized via spin-diffusion from the ↑D in the ↑H↑D, after which the T in the DT is polarized with the radio-frequency transitions corresponding almost exactly to the situation in FIG. 2, with $m_H$ replaced by $m_T$. The ↑D spin-diffusion is slower than that of ↑H, which makes the method in Example 6 somewhat preferable. The advantage here is that polarized ↑D↑T is immediately obtained. Of course, parallel streams of H↑D and H↑T can be fed in as nuclear fuels, which can be made almost as useful as the ↑D↑T.

In the descriptions given above, rapid heating of the crystals to temperatures still in the solid phase for annealing, as well as rapid heating through the phase transition to the liquid for an effective anneal, in that one gets immediate dissolution of all atomic defects, takes place. These are then followed by rapid re-crystallization or rapid temperature reduction to the storage temperature. For these thermal excursions, the time spent in the solid phase near the melting point must be kept short, since spatial diffusion which occurs actively near the melting point provides an efficient spin-lattice relaxation, and hence depolarization, mechanism. Examination of the measured relaxation times involved show that it is perfectly feasible to pass in either warming or cooling directions through this region without incurring appreciable depolarization. The rapid heating can be effected on samples of substantial volume by using electro-magnetic radiation tuned so that it penetrates the sample to a sufficient degree, thus precluding thermal conductivity bottlenecks. For the very thin deposited samples, simple conduction heating can be effective as well. The relaxation times vary in the liquid or gaseous phases, but are sufficiently long in most cases. For example, the proton relaxation time in the 20 K. temperature range for liquid HD exceeds 30 seconds, and for o-$D_2$ in the liquid phase, the deuteron relaxation time is about 1000 seconds. These are certainly sufficient times to liquify and re-condense without losing appreciable nuclear spin-polarization. Similarly, from the liquid phase, there is ample time to form a high density gaseous beam by rapid vaporization without incurring serious depolarization. This can be used for a nuclear fuel in the gas puffing mode, or can be used as high density polarized beams.

While this invention has been described with reference to the structure disclosed herein, it is not confined to the details set forth and this application is intended to cover any modifications or changes as may come within the scope of the following claims.

I claim:

1. The method of producing polarized deuterons in solid HD that includes the steps of
    providing a sample of HD containing a $10^{-4}$ to $10^{-3}$ concentration (mole fraction) of p-$D_2$,
    irradiating the sample with radiation that produces defect centers in the sample for increasing the conversion rate of p-$D_2$ to o-$D_2$,
    subjecting the sample simultaneously to a magnetic field greater than 10 Tesla and a temperature less than 10 m°K. such that the $H_o$/T ratio is in a range of between 1000 and 7500 T/°K. corresponding to a deuteron polarization range of 20% to 90%, and
    allowing p-$D_2$ to convert to o-$D_2$ to increase the relaxation time of the polarized deuterons at ordinary liquid helium temperatures of 1°–4° K. and low magnetic fields of about 0.1 Tesla.

2. The method of claim 1 that further includes annealing the sample to remove said defects after polarization, said annealing performed within a time that is less than the depolarization time of the deuteron, to achieve a metastable high polarization state at ordinary liquid helium temperatures.

3. The method of producing polarized deuterons in solid HD that includes the steps of
    providing a sample of pure HD,
    irradiating the solid sample at about 4° K. with radiation to create defect centers in said sample which act as relaxation agents in regard to the polarized deuterons,
    subjecting the sample simultaneously to a high strength magnetic field greater than 10 Tesla and a low temperature less than 10 m°K. wherein the $H_o$/T ratio is in a range of about between 1000 to 7500 T/°K., corresponding to a deuteron polarization range of 20% to 90%, and
    annealing the sample to remove said defects after polarization within a time period that is less than that of the depolarization time, to achieve a metastable high polarization state at ordinary liquid helium temperatures of 1°–4° K. and low magnetic fields of about 0.1 Tesla.

4. The method of producing polarized deuterons in solid $D_2$ that includes the steps of
    providing a sample of pure o-$D_2$,
    adding a concentration of between $10^{-4}$ and $10^{-3}$ (mole fraction) of p-$D_2$ to the sample to facilitate spin-lattice relaxation of the sample,
    irradiating the sample with radiation that produces defect centers in the sample for increasing the conversion of p-$D_2$ to o-$D_2$,
    subjecting the sample to a magnetic field greater than 10 Tesla and a temperature less than 10 m°K. such that the $H_o$/T ratio is in a range of between 1000 and 7500 T/°K. corresponding to a deuteron polarization range of 18% to 80%, and
    allowing p-$D_2$ to convert to o-$D_2$ to increase the relaxation time of the deuterons at ordinary liquid helium temperatures of 1°–4° K. and low magnetic fields of about 0.1 Tesla.

5. The method of claim 4 that further includes annealing the sample to remove said defects after polarization, said annealing being performed within a time that is less than the depolarization time of the deuterons whereby a metastable high polarization state is achieved at ordinary liquid helium temperatures of 1°–4° K. and low magnetic fields of about 0.1 Tesla.

6. The method of producing polarized deuterons in solid $D_2$ that includes the steps of
providing a sample of pure o-$D_2$,
irradiating the solid sample at about 4° K. with radiation capable of producing damage centers for controlling the spin relaxation of the deuterons,
subjecting the sample to a magnetic field greater than 10 Tesla and a temperature less than 10 m°K. wherein the $H_o/T$ ratio is in a range of about between 1000 and 7500 T/°K. corresponding to a deuteron polarization range of about 18% to 80%, and
annealing the sample to remove said defects within a time that is less than the depolarization time of the deuterons, whereby a metastable high polarization state is achieved at ordinary liquid helium temperatures of 1°–4° K. and low magnetic fields of about 0.1 Tesla.

7. A method of producing polarized tritons in solid HT or DT including the steps of
providing a sample selected from one of the materials consisting of HT and DT,
adding a $10^{-4}$ to $10^{-3}$ concentration (mole fraction) of o-$T_2$ to the sample,
placing the sample in a dilution refrigerator having a given heat removal capacity and simultaneously exposing the sample to a magnetic field such that the $H_o/T$ ratio is about between 190 and 1350 T/°K. corresponding to triton polarization range of 20% to 90%,
limiting the amount of tritons in the sample such that the heat load from absorbed triton beta radiation does not exceed the heat removal capacity of the dilution refrigerator,
allowing o-$T_2$ to be converted to p-$T_2$ to extend the o-$T_2$ spin-lattice relaxation time of the polarized tritons at ordinary liquid helium temperatures of 1°–° K. and low magnetic fields of about 0.1 Tesla, and
annealing the polarized sample periodically to retain the extended spin-lattice relaxation time at ordinary liquid helium temperatures of 1°–4° K. and low magnetic fields of about 0.1 Tesla.

8. The method of claim 7 wherein the thickness of the triton containing part of the sample is less than one micron to limit the accrued radiation damage.

9. The method of producing polarized tritons in solid HT or DT that includes the steps of
providing a sample selected from one of the materials consisting of HT and DT,
placing the sample in a dilution refrigerator having a given heat removal capacity and simultaneously exposing it to a magnetic field such that the $H_o/T$ ratio is about between 190 and 1350 T/°K. corresponding to a triton polarization range of 20% to 90%,
limiting the amount of tritons in the sample such that the heat load from absorbed triton beta radiation does not exceed the heat removal capacity of the dilution refrigerator,
utilizing the radiation damage centers produced by the triton beta radiation to control the spin of spin-lattice relaxation of the polarized sample, and
annealing the polarized sample periodically to retain the increased spin-lattice relaxation time at ordinary liquid helium temperatures of 1°–4° K. and low magnetic fields of about 0.1 Tesla.

10. The method of claim 9 wherein the thickness of the triton containing part of the sample is less than one micron to limit the accrued radiation damage.

11. The method of producing polarized tritons in solid HT that includes the steps of
epitaxially depositing alternate layers of HT having a thickness of about 1 $\mu$m on thicker layers of solid HD at temperatures 0.3 to 4° K. wherein the protons in the HD are polarized and the deuterons are either polarized or unpolarized,
allowing the proton polarization in the HD layer to diffuse to polarize the protons in the HT layers through spin diffusion,
placing the layers in a radio frequency field, and
radiating the layers with radio frequencies to induce partially forbidden transitions between the polarized proton and the unpolarized triton coupled energy levels to polarize said tritons directly.

12. The method of producing polarized tritons and deuterons in solid DT that includes the steps of
epitaxially depositing alternate layers of DT having a thickness of about 1 $\mu$m on thicker layers of solid HD at liquid helium temperatures of 0.3° to 4° K. wherein the deuterons in the HD are polarized and the protons are either polarized or unpolarized,
allowing the deuteron polarization in the HD layers to diffuse to polarize the deuterons in the DT layers,
placing the layers in a radio frequency field, and
radiating the layers with radio frequencies to induce partially forbidden transitions between the polarized deuteron and the unpolarized triton coupled energy levels to polarize the tritons directly.

13. The method of producing liquid and gaseous HD, $D_2$, HT and DT containing polaraized ↑D and ↑T nuclei from solid samples of these materials containing the ↑D and ↑T by heating the solid material rapidly by exposing it to a high intensity electromagnetic radiation field at wavelengths which penetrate the solid material to heat said material to cause a uniform temperature rise and phase transformation with sufficient rapidity that the heating time and the phase transformation time are less than the nuclear spin-lattice relaxation time for any temperature increment or phase change encountered in the process.

* * * * *